(12) United States Patent
Han

(10) Patent No.: US 11,960,046 B2
(45) Date of Patent: Apr. 16, 2024

(54) METHOD FOR DETERMINING IN-SITU MAXIMUM HORIZONTAL STRESS

(71) Applicant: ARAMCO SERVICES COMPANY, Houston, TX (US)

(72) Inventor: Yanhui Han, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 388 days.

(21) Appl. No.: 17/155,803

(22) Filed: Jan. 22, 2021

(65) Prior Publication Data
US 2022/0236446 A1    Jul. 28, 2022

(51) Int. Cl.
  *G01V 20/00*    (2024.01)
  *E21B 47/04*    (2012.01)
  (Continued)

(52) U.S. Cl.
  CPC ............. *G01V 20/00* (2024.01); *E21B 47/04* (2013.01); *E21B 49/00* (2013.01); *G06F 30/20* (2020.01);
  (Continued)

(58) Field of Classification Search
  CPC ... G01V 99/005; G06F 30/20; G06F 2111/10; E21B 47/04; E21B 49/00
  (Continued)

(56) References Cited

U.S. PATENT DOCUMENTS

| 6,351,991 B1 * | 3/2002 | Sinha | G01V 1/50 |
| | | | 73/152.16 |
| 6,651,738 B1 * | 11/2003 | Solfronk | E21B 34/063 |
| | | | 166/133 |

(Continued)

FOREIGN PATENT DOCUMENTS

| CN | 103510948 A | 1/2014 |
| CN | 109241651 A | 1/2019 |

OTHER PUBLICATIONS

Zoback et al. hereafter Zoback ("Determination of stress orientation and magnitude in deep wells", International Journal of Rock Mechanics & Mining Sciences 40 (2003) 1049-1076). (Year: 2003).*

(Continued)

*Primary Examiner* — Iftekhar A Khan
(74) *Attorney, Agent, or Firm* — Osha Bergman Watanabe & Burton LLP

(57) ABSTRACT

A method for obtaining a maximum horizontal stress at a depth of a geological formation, includes: setting an estimate $S_{Hmax}$ of the maximum horizontal stress; conducting an elastoplastic modeling simulation of the geological formation around a wellbore with the estimate $S_{Hmax}$ and obtaining a simulated value $\phi_{b,1}$ of a breakout angle, wherein the breakout angle is a half-width of a breakout region; and upon determining that the estimate $\phi_{b,1}$ is greater than or equal to a prescribed value and is different from a measured breakout angle $\phi_{b,m}$ at the depth by more than a threshold value, repeatedly changing the estimate $S_{Hmax}$ and conducting the elastoplastic modeling simulation.

11 Claims, 9 Drawing Sheets

(51) Int. Cl.
  *E21B 49/00* (2006.01)
  *G06F 30/20* (2020.01)
  *G06F 111/10* (2020.01)

(52) U.S. Cl.
  CPC ....... *E21B 2200/20* (2020.05); *G06F 2111/10* (2020.01)

(58) Field of Classification Search
  USPC .......................................................... 703/2
  See application file for complete search history.

(56) References Cited

U.S. PATENT DOCUMENTS

| | | | | |
|---|---|---|---|---|
| 7,941,307 | B2* | 5/2011 | Symington | E21B 49/006 703/10 |
| 2004/0176911 | A1* | 9/2004 | Bratton | G01V 1/50 702/6 |
| 2009/0065252 | A1* | 3/2009 | Moos | G01V 11/002 175/50 |
| 2009/0065253 | A1* | 3/2009 | Suarez-Rivera | E21B 43/17 166/250.1 |
| 2009/0070042 | A1* | 3/2009 | Birchwood | G01V 1/50 702/11 |
| 2009/0109794 | A1* | 4/2009 | Sinha | E21B 49/006 367/35 |
| 2010/0121623 | A1* | 5/2010 | Yogeswaren | G01V 1/284 703/2 |
| 2010/0250214 | A1* | 9/2010 | Prioul | G01V 1/48 703/2 |
| 2011/0246159 | A1* | 10/2011 | Herwanger | G01V 1/306 703/7 |
| 2011/0283807 | A1* | 11/2011 | Chan | G01N 3/10 73/845 |
| 2012/0097450 | A1* | 4/2012 | Wessling | E21B 47/0025 702/9 |
| 2012/0163123 | A1* | 6/2012 | Moos | G01V 1/284 367/31 |
| 2012/0173216 | A1* | 7/2012 | Koepsell | E21B 49/00 703/6 |
| 2013/0289962 | A1* | 10/2013 | Wendt | G01V 1/306 703/10 |
| 2014/0067269 | A1* | 3/2014 | Maerten | G01V 11/00 702/2 |
| 2014/0246244 | A1* | 9/2014 | Shen | E21B 21/08 175/57 |
| 2014/0358510 | A1* | 12/2014 | Sarkar | G06F 30/20 703/10 |
| 2015/0168597 | A1* | 6/2015 | Bai | G01V 99/00 703/10 |
| 2015/0205006 | A1* | 7/2015 | Maerten | G06F 30/20 703/2 |
| 2015/0301223 | A1* | 10/2015 | Xu | G01V 1/50 703/2 |
| 2016/0108705 | A1* | 4/2016 | Maxwell | E21B 43/267 166/250.1 |
| 2016/0266268 | A1* | 9/2016 | Amer | G01V 99/00 |
| 2017/0009575 | A1* | 1/2017 | Liu | G06F 30/20 |
| 2017/0023691 | A1* | 1/2017 | Donald | G01V 11/00 |
| 2017/0097444 | A1* | 4/2017 | Shen | G01V 20/00 |
| 2017/0160429 | A1* | 6/2017 | Berard | G01V 20/00 |
| 2017/0269244 | A1* | 9/2017 | Teran | E21B 49/00 |
| 2017/0275970 | A1* | 9/2017 | Crawford | G01V 20/00 |
| 2018/0355707 | A1* | 12/2018 | Rodriguez Herrera | G01V 1/288 |
| 2019/0377101 | A1* | 12/2019 | Li | E21B 47/06 |
| 2020/0102822 | A1* | 4/2020 | Alvarellos Iglesias | E21B 47/08 |
| 2021/0254458 | A1* | 8/2021 | Camargo | E21B 41/00 |
| 2021/0310352 | A1* | 10/2021 | Pelletier | E21B 49/10 |
| 2021/0332690 | A1* | 10/2021 | Stishenko | E21B 44/02 |
| 2022/0113447 | A1* | 4/2022 | Xia | E21B 43/26 |
| 2022/0120933 | A1* | 4/2022 | Noufal | G01V 11/002 |
| 2023/0082833 | A1* | 3/2023 | Crawford | E21B 49/06 166/250.01 |

OTHER PUBLICATIONS

Barton, Colleen A. et al., "In-Situ Stress Orientation and Magnitude at the Fenton Geothermal Site, New Mexico, Determined from Wellbore Breakouts", Geophysical Research Letters, American Geophysical Union, vol. 15, No. 5, May 1988, pp. 467-470 (4 pages).
International Search Report and Written Opinion of the International Searching Authority issued in corresponding International Application No. PCT/US2022/013309, dated May 3, 2022 (18 pages).
Hamid, Osman et al., "Wellbore Stability Analysis Using Acoustic Radial Profiles and an Elastoplastic Model"; Proceedings of the Abu Dhabi International Petroleum Exhibition and Conference; Paper No. SPE-171838-MS; pp. 1-11; Nov. 10-13, 2014 (11 pages).
Bin Sadiq, Rana Ammad et al., "Borehole breakouts"; <https://tu-freiberg.de/sites/default/files/media/professur-jelsmechanik-32204/E-book/37_borehole_breakouts_0.pdf>; pp. 1-25; Aug. 27, 2018 (25 pages).

* cited by examiner

METHOD FOR DETERMINING IN-SITU MAXIMUM HORIZONTAL STRESS

BACKGROUND

In-situ determination of stress conditions in a geological formation is critical to the operation safety and efficiency of drilling, completion, stimulation, and production. Stress conditions in geological formation can be described, in general, with respect to three principal stresses: vertical stress, minimum horizontal stress, and maximum horizontal stress. Among these, vertical stress and minimum horizontal stress can be reliably computed or measured. However, determination of maximum horizontal stress has been challenging.

One widely used practical method to determine the maximum horizontal stress is to combine caliper logging data with measured minimum horizontal stress, formation pressure, wellbore mud pressure, and formation mechanical strength properties. According to Barton et al., a maximum horizontal stress $S_{Hmax}$ is estimated by the following Equation (1):

$$S_{Hmax} = \frac{ucs + \Delta P_W + 2P_p}{1 - 2\cos 2\theta_b} - S_{hmin}\frac{1 + 2\cos 2\theta_b}{1 - 2\cos 2\theta_b} \quad (1)$$

where ucs is the formation's unconfined compressive strength, $\theta_b$ is the wellbore angle where the breakout starts measured from the direction of $S_{Hmax}$, $P_p$ is the formation's pore pressure, and $\Delta P_w$ is the wellbore pressure above the formation pore pressure $P_p$.

Plastic deformation of the surrounding formation is not considered in the above method of determination of the maximum horizontal stress $S_{Hmax}$. When plastic deformation occurs, stress relaxation also occurs. Consequently, the above method tends to underestimate the maximum horizontal stress.

SUMMARY

According to one or more embodiments of the present invention, a method for obtaining a maximum horizontal stress at a depth of a geological formation, includes: setting an estimate $S_{Hmax}$ of the maximum horizontal stress; conducting an elastoplastic modeling simulation of the geological formation around a wellbore with the estimate $S_{Hmax}$ and obtaining a simulated value $\phi_{b,1}$ of a breakout angle, wherein the breakout angle is a half-width of a breakout region; and upon determining that the estimate $\phi_{b,1}$ is greater than or equal to a prescribed value and is different from a measured breakout angle $\phi_{b,m}$ at the depth by more than a threshold value, repeatedly changing the estimate $S_{Hmax}$ and conducting the elastoplastic modeling simulation.

According to one or more embodiments of the present invention, a system, includes: a logging system coupled to a plurality of logging tools; a drilling system coupled to the logging system; and a formation breakout simulator comprising a computer processor, wherein the formation breakout simulator is coupled to the logging system and the drilling system, the formation breakout simulator including functionality for: setting an estimate $S_{Hmax}$ of a maximum horizontal stress; conducting an elastoplastic modeling simulation of a geological formation around a wellbore with the estimate $S_{Hmax}$ and obtaining a simulated value $\phi_{b,1}$ of a breakout angle, wherein the breakout angle is a half-width of a breakout region; and upon determining that the estimate $\phi_{b,1}$ is greater than or equal to a prescribed value and is different from a measured breakout angle $\phi_{b,m}$ at a depth by more than a threshold value, repeatedly changing the estimate $S_{Hmax}$ and conducting the elastoplastic modeling simulation.

According to one or more embodiments of the present invention, a non-transitory computer readable medium storing instructions executable by a computer processor, the instructions includes functionality for: setting an estimate $S_{Hmax}$ of a maximum horizontal stress; conducting an elastoplastic modeling simulation of a geological formation around a wellbore with the estimate $S_{Hmax}$ and obtaining a simulated value $\phi_{b,1}$ a breakout angle, wherein the breakout angle is a half-width of a breakout region; and upon determining that the estimate $\phi_{b,1}$ is greater than or equal to a prescribed value and is different from a measured breakout angle $\phi_{b,m}$ at a depth by more than a threshold value, repeatedly changing the estimate $S_{Hmax}$ and conducting the elastoplastic modeling simulation.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
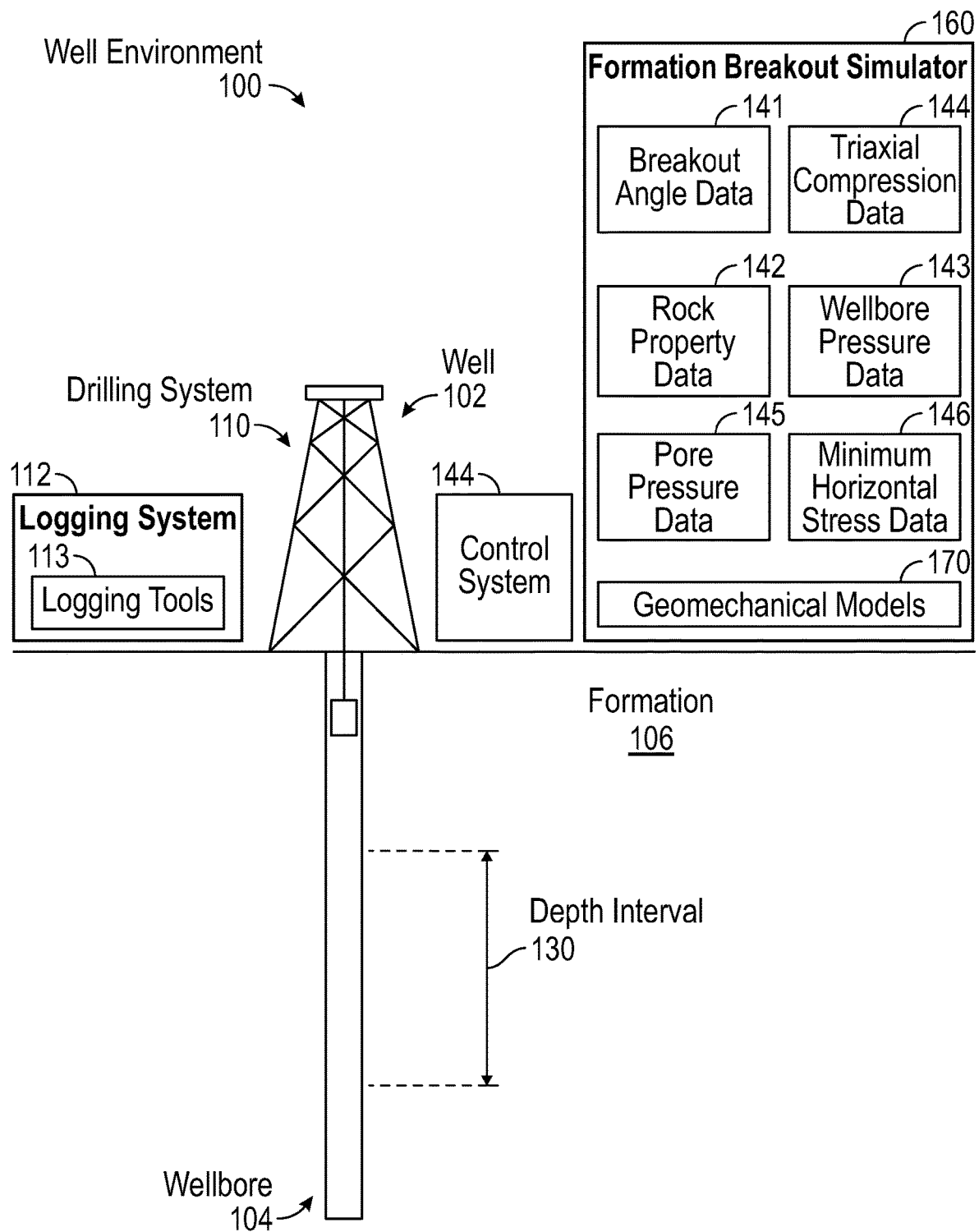
FIG. 1 shows a schematic diagram of a well environment in accordance with one or more embodiments.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with hydrocarbon production systems have not been shown or described in detail to avoid unnecessarily obscuring descriptions of the implementations and embodiments. For the sake of continuity, and in the interest of conciseness, same or similar reference characters may be used for same or similar objects in multiple figures.

In this disclosure, terms well, oil well, gas well, oil and gas well, and like terms may be used interchangeably without narrowing the type of well unless specifically stated.

Regarding directions of a coordinate system, the axial direction may be a direction parallel to an axis of rotation. In a well, the axial direction may be the direction parallel to the wellbore and may be local. That is, if the wellbore changes direction along its length, one may still refer to an axial direction at any point along the wellbore as being tangential to the direction of the wellbore at that location. The radial direction is perpendicular to the axial direction and points along a radius away from the axis. The azimuthal direction is perpendicular to the axial and the radial directions.

A fluid is a material that is capable of flowing. Thus, both liquids and gases are fluids. In oil and gas wells, oil, gas, and water are examples of fluids that may be encountered.

FIG. 1 shows a schematic diagram of a well environment in accordance with one or more embodiments. As shown, a well environment (100) may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation porosity, formation permeability, density, resistivity, water saturation, free water level (FWL), and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

The well environment (100) may include a drilling system (110), a logging system (112), a control system (114), and a formation breakout simulator (160). The drilling system (110) may include a drill string, drill bit, a mud circulation system and/or the like for use in boring the wellbore (104) into the formation (106). The control system (114) may include hardware and/or software for managing drilling operations, maintenance operations, and/or stimulation treatment operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Turning to the formation breakout simulator (160), a formation breakout simulator (160) may include hardware and/or software with functionality for storing and analyzing well logs, core specimen data, seismic data, and/or other types of data to generate and/or update one or more geomechanical models. While the formation breakout simulator (160) is shown at a well site, in some embodiments, the formation breakout simulator (160) may be remote from a well site. In some embodiments, the formation breakout simulator (160) is implemented as part of a software platform for the control system (114). The software platform may obtain data acquired by the drilling system (110) and logging system (112) as inputs, which may include multiple data types from multiple sources. The software platform may aggregate the data from these systems (110, 112) in real time for rapid analysis. In some embodiments, the control system (114), the logging system (112), and/or the formation breakout simulator (160) may include a computer system that is similar to the computer system (900) described below with regard to FIG. 9 and the accompanying description.

The logging system (112) may include one or more logging tools (113), such as a nuclear magnetic resonance (NMR) logging tool, a resistivity logging tool, and/or a caliper logging tool for use in generating well logs of the formation (106). For example, a logging tool may be lowered into the wellbore (104) to acquire measurements as the tool traverses a depth interval (130) (e.g., a targeted formation section) of the wellbore (104). The plot of the logging measurements versus depth may be referred to as a "log" or "well log". Well logs may provide depth measurements of the well (104) that describe such formation characteristics as formation porosity, formation permeability, resistivity, water saturation, and the like. The resulting logging measurements may be stored and/or processed, for example, by the control system (114), to generate corresponding well logs for the well (102). A well log may include, for example, a plot of a logging response time versus true vertical depth (TVD) across the depth interval (130) of the wellbore (104). A well log may also include, for example, caliper measurements of the wellbore that describes a cross-sectional shape of the well bore at any given depth. Similarly, an in situ scratch testing tool may be lowered into the wellbore (104) and obtain a continuous strength log across the depth interval of interest (130). Such a log would provide for this disclosure critical rock property information.

Formation characteristics may be determined using a variety of different techniques. For example, certain formation characteristics can be determined via coring (e.g., physical extraction of rock specimens) to produce core specimens and/or logging operations (e.g., wireline logging, logging-while-drilling (LWD) and measurement-while-drilling (MWD)). Coring operations may include physically extracting a rock specimen from a region of interest within the wellbore (104) for detailed laboratory analysis. For example, when drilling an oil or gas well, a coring bit may cut core plugs (or "cores" or "core specimens") from the formation (106) and bring the core plugs to the surface, and these core specimens may be analyzed at the surface (e.g., in a lab) to determine various characteristics of the formation (106) at the location where the specimen was obtained.

Turning to various coring technique examples, conventional coring may include collecting a cylindrical specimen of rock from the wellbore (104) using a core bit, a core barrel, and a core catcher. The core bit may have a hole in its center that allows the core bit to drill around a central cylinder of rock. Subsequently, the resulting core specimen may be acquired by the core bit and disposed inside the core barrel. More specifically, the core barrel may include a special storage chamber within a coring tool for holding the core specimen. Furthermore, the core catcher may provide a grip to the bottom of a core and, as tension is applied to the drill string, the rock under the core breaks away from the undrilled formation below coring tool. Thus, the core catcher may retain the core specimen to avoid the core specimen falling through the bottom of the drill string.

Figure 2:
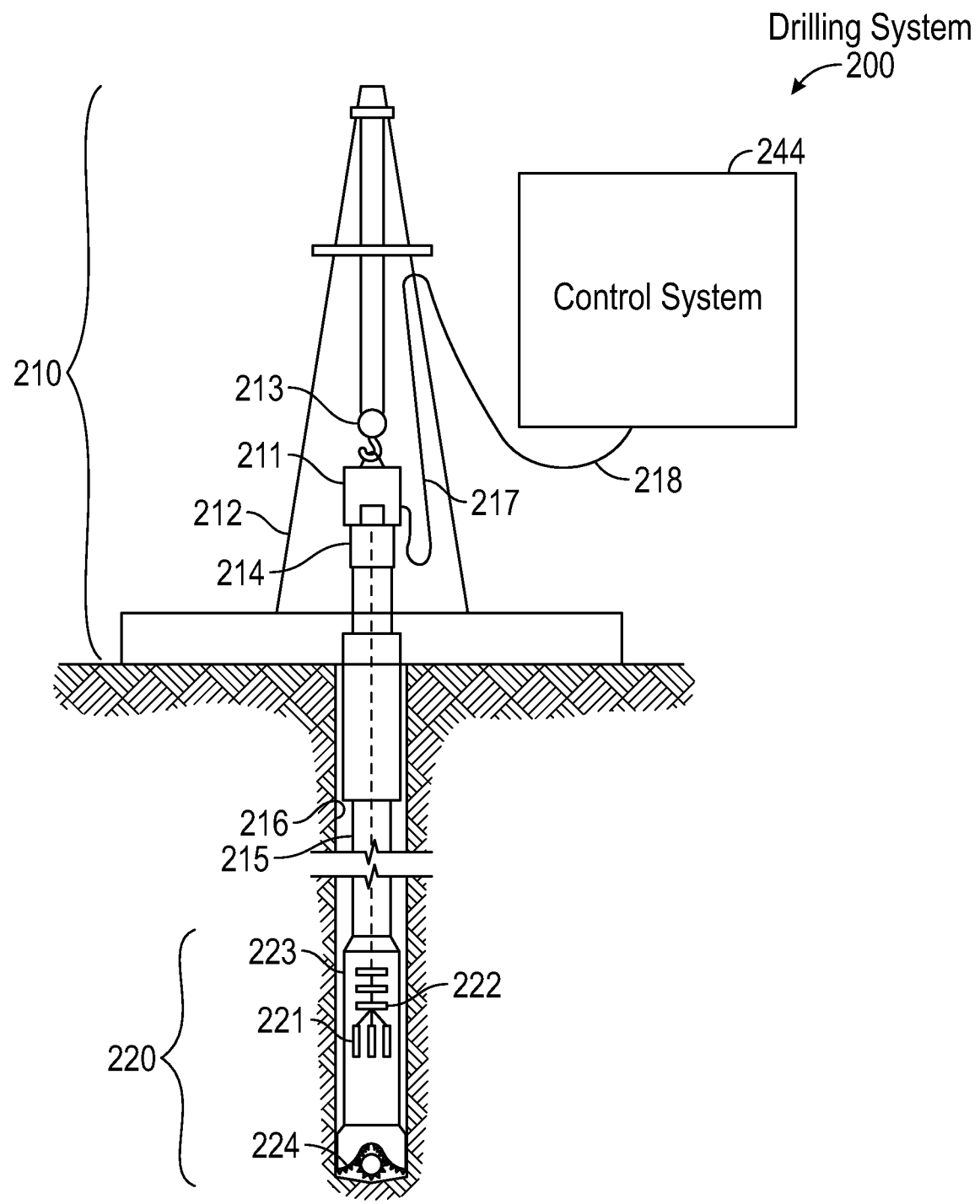
FIG. 2 shows a schematic diagram of a drilling system in accordance with one or more embodiments.

FIG. 2 shows a schematic diagram of a drilling system in accordance with one or more embodiments. As shown, a drilling system (200) may include a top drive drill rig (210) arranged around the setup of a drill bit logging tool (220). A top drive drill rig (210) may include a top drive (211) that may be suspended in a derrick (212) by a travelling block (213). In the center of the top drive (211), a drive shaft (214) may be coupled to a top pipe of a drill string (215), for example, by threads. The top drive (211) may rotate the drive shaft (214), so that the drill string (215) and a drill bit logging tool (220) cut the rock at the bottom of a wellbore (216). A power cable (217) supplying electric power to the top drive (211) may be protected inside one or more service loops (218) coupled to a control system (244). As such, drilling mud may be pumped into the wellbore (216) through a mud line, the drive shaft (214), and/or the drill string (215). The control system (244) may be similar to control system (114) described Moreover, when completing a well, casing may be inserted into the wellbore (216). The sides of the wellbore (216) may require support, and thus the casing may be used for supporting the sides of the wellbore (216). As such, a space between the casing and the untreated sides of the wellbore (216) may be cemented to hold the casing in place. The cement may be forced through a lower end of the casing and into an annulus between the casing and a wall of the wellbore (216). More specifically, a cementing plug may be used for pushing the cement from the casing. For example, the cementing plug may be a rubber plug used to separate cement slurry from other fluids, reducing contamination and maintaining predictable slurry performance. A displacement fluid, such as water, or an appropriately weighted drilling mud, may be pumped into the casing above the cementing plug. This displacement fluid may be pressurized fluid that serves to urge the cementing plug downward through the casing to extrude the cement from the casing outlet and back up into the annulus.

As further shown in FIG. 2, sensors (221) may be included in a sensor assembly (223), which is positioned adjacent to a drill bit (224) and coupled to the drill string (215). Sensors (221) may also be coupled to a processor assembly (223) that includes a processor, memory, and an analog-to-digital converter (222) for processing sensor measurements. For example, the sensors (221) may include acoustic sensors, such as accelerometers, measurement microphones, contact microphones, and hydrophones. Likewise, the sensors (221) may include other types of sensors, such as transmitters and receivers to measure resistivity, gamma ray detectors, a caliper, etc. The sensors (221) may include hardware and/or software for generating different types of well logs (such as acoustic logs or density logs) that may provide well data about a wellbore, including porosity of wellbore sections, gas saturation, bed boundaries in a geologic formation, fractures in the wellbore or completion cement, and many other pieces of information about a formation. If such well data is acquired during drilling operations (i.e., logging-while-drilling), then the information may be used to make adjustments to drilling operations in real-time. Such adjustments may include rate of penetration (ROP), drilling direction, altering mud weight, and many others drilling parameters.

Returning to FIG. 1, in some embodiments, a formation breakout simulator determines stress conditions in the formation using breakout angle data (e.g., breakout angle data (141)), rock property data (e.g., rock property data (142)), wellbore pressure data (e.g., wellbore pressure data (143)), triaxial compression data (e.g., triaxial compression data (144)), pore pressure data (e.g., pore pressure data (145)), and/or minimum horizontal stress data (e.g., minimum horizontal stress data (146)). For example, breakout angle data may describe breakout angles in the wellbore (104) at various depths. Rock property data may describe one or more petrophysical and/or geological properties, such as mineral data (e.g., mineralogy compositions), total amount of organic carbon, porosity, pore size distribution, damage data regarding a degree of internal damage within rock specimens, etc. of a geological region. Wellbore pressure data may describe wellbore pressures in the wellbore (104) at various depths. Triaxial compression data may describe compression test measurements, stress data, and/or strain data that is acquired using a triaxial cell within a triaxial measurement system. Pore pressure data may describe pore pressures of the formation at various depths. Minimum horizontal stress data may describe minimum horizontal stresses obtained using a minifrac test.

In some embodiments, a formation breakout simulator generates one or more geomechanical models (e.g., geomechanical models (170)) that describes stress conditions around the wellbore for one or more geological regions. In particular, a geomechanical model may describe principal stresses in a horizontal plane when the wellbore extends in the vertical direction, where the geomechanical model may be based on laboratory data and/or field data acquired at a wellsite.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
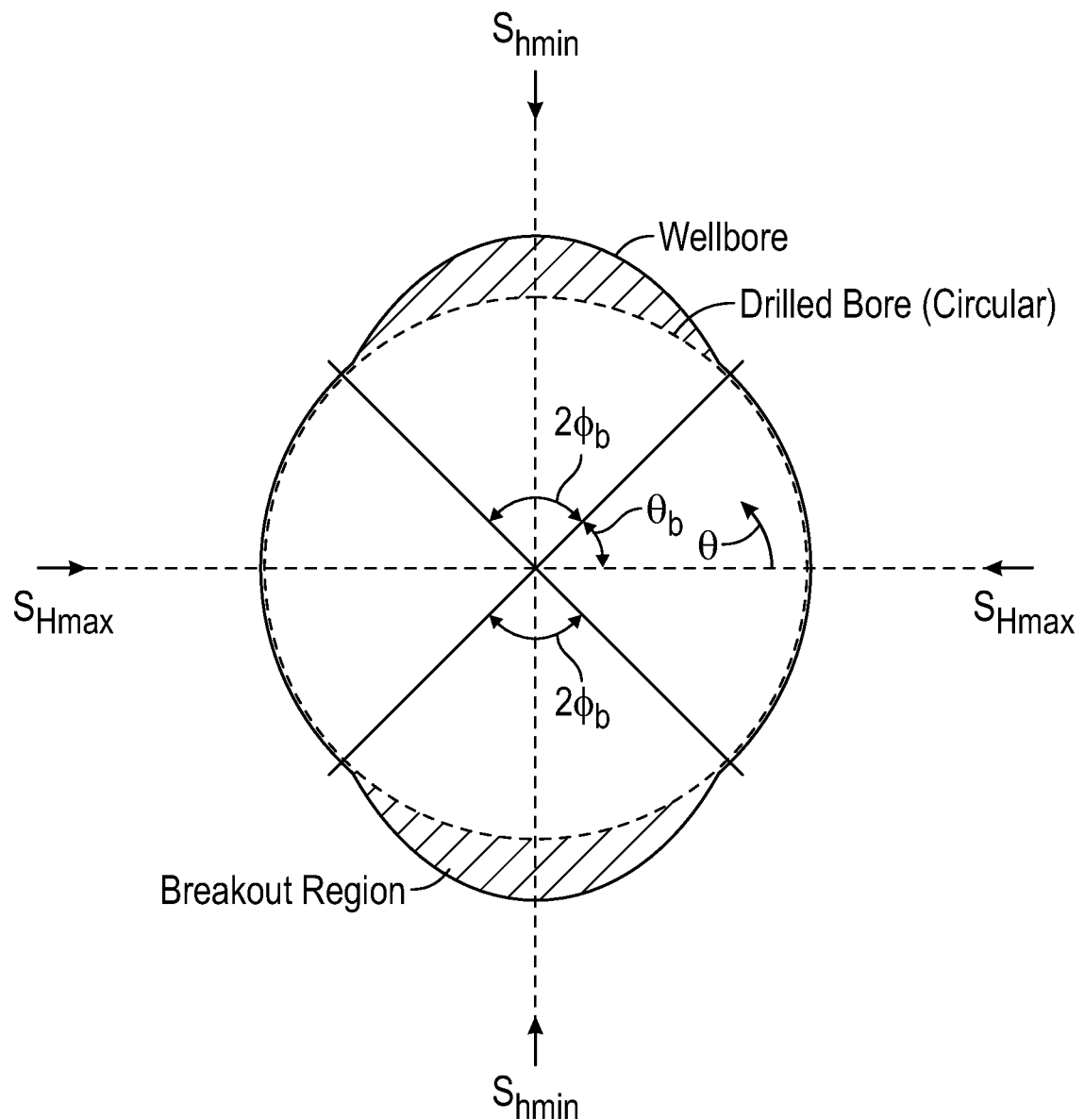
FIG. 3 shows a schematic diagram of a cross-section of an exemplary wellbore in accordance with one or more embodiments.

FIG. 3 shows a schematic diagram of a cross-section of an exemplary wellbore in accordance with one or more embodiments. Stress conditions in the formation are generally described with respect to three principal stresses: vertical stress, minimum horizontal stress $S_{hmin}$, and maximum horizontal stress $S_{Hmax}$. The vertical stress exerts in a direction along the wellbore that extends in the vertical direction. The minimum and maximum horizontal stresses $S_{hmin}$, $S_{Hmax}$ exert perpendicular to the vertical direction (i.e., in the plane of the drawing shown in FIG. 3). Furthermore, the minimum horizontal stress $S_{hmin}$ acts in perpendicular to the maximum horizontal stress $S_{Hmax}$.

The drilled bore is initially substantially circular. However, stress concentration that appears around a circular hole in the formation causes breakout regions to appear in azimuthal directions along the minimum horizontal stress $S_{hmin}$. Each of the breakout regions subtends an angle corresponds to twice of the breakout angle $\phi_b$. As easily seen in FIG. 3, $\theta_b + \phi_b = 90$ degrees where $\theta_b$ is the wellbore angle where the breakout starts measured from the direction of $S_{Hmax}$.

When it is assumed that the formation acts purely elastic in the regions before breakouts occur (i.e., breakout regions), a circumferential stress $S_\theta$ at the wall of the wellbore can be obtained analytically as the following Equation (2):

$$S_\theta = S_{Hmax}(1-2\cos 2\theta) + S_{hmin}(1+2\cos 2\theta) - P_w \quad (2)$$

where $\theta$ is an angle measured from the azimuth of $S_{Hmax}$ and $P_w$ is the wellbore pressure. Namely, the circumferential stress So becomes minimum at the azimuths of $S_{Hmax}$ and gradually increases to a maximum value at the azimuths of $S_{hmin}$.

Now, effective stresses $\sigma_{Hmax}$ and $\sigma_{hmin}$ are considered instead of $S_{Hmax}$ and $S_{hmin}$, which are derived as:

$$\sigma_{Hmax} = S_{Hmax} - \alpha P_p$$

$$\sigma_{hmin} = S_{hmin} - \alpha P_p$$

where $\alpha$ is the Biot coefficient of effective stress that is assumed to be 1. Then, the circumferential stress $S_\theta$ expressed by Equation (2) can be replaced by the effective circumferential stress $\sigma_\theta$ as shown in the following Equation (3):

$$\sigma_\theta = \sigma_{Hmax}(1-2\cos 2\theta) + \sigma_{hmin}(1+2\cos 2\theta) - \Delta P_w. \quad (3)$$

At the boundary of the breakout region (i.e., $\theta = \theta_b$) the compressive shear yielding takes place and Mohr-Coulomb failure criterion $$\sigma_{\theta\theta} = \frac{1+\sin\varphi}{1-\sin\varphi}\sigma_{rr} + ucs$$

is satisfied where $\varphi$ is a friction angle of the formation material. On the wall of the well bore, the radial effective stress $\sigma_{rr}$ zero and, therefore, the failure criterion becomes $\sigma_{\theta\theta} = ucs$. Then, Equation (3) yields the following Equation (4), which is a simplified form of Equation (1):

$$\sigma_{Hmax} = \frac{ucs + \Delta P_W}{1 - 2\cos 2\theta_b} - \sigma_{hmin}\frac{1 + 2\cos 2\theta_b}{1 - 2\cos 2\theta_b}. \quad (4)$$

The formation's unconfined compressive strength ucs may be given as $$ucs = \frac{2c\cos\varphi}{1-\sin\varphi},$$

where c is the cohesion of the formation material.

The above discussion of determination of the maximum horizontal stress $S_{Hmax}$ (or the effective maximum horizontal stress $\sigma_{Hmax}$) is based on the assumption of purely elastic behavior of the formation and the distribution of the circumferential stress $S_\theta$ (or the effective circumferential stress $\sigma_\theta$) around the circular bore as described by Equation (2) or (3). Therefore, when elastoplastic behavior of the formation is considered, Equation (2) or (3) does not yield proper results. In other words, results obtained using Equation (2) or (3) may need to be adjusted according to simulations of the elastoplastic behavior, for example, using a computer.

Figure 4:
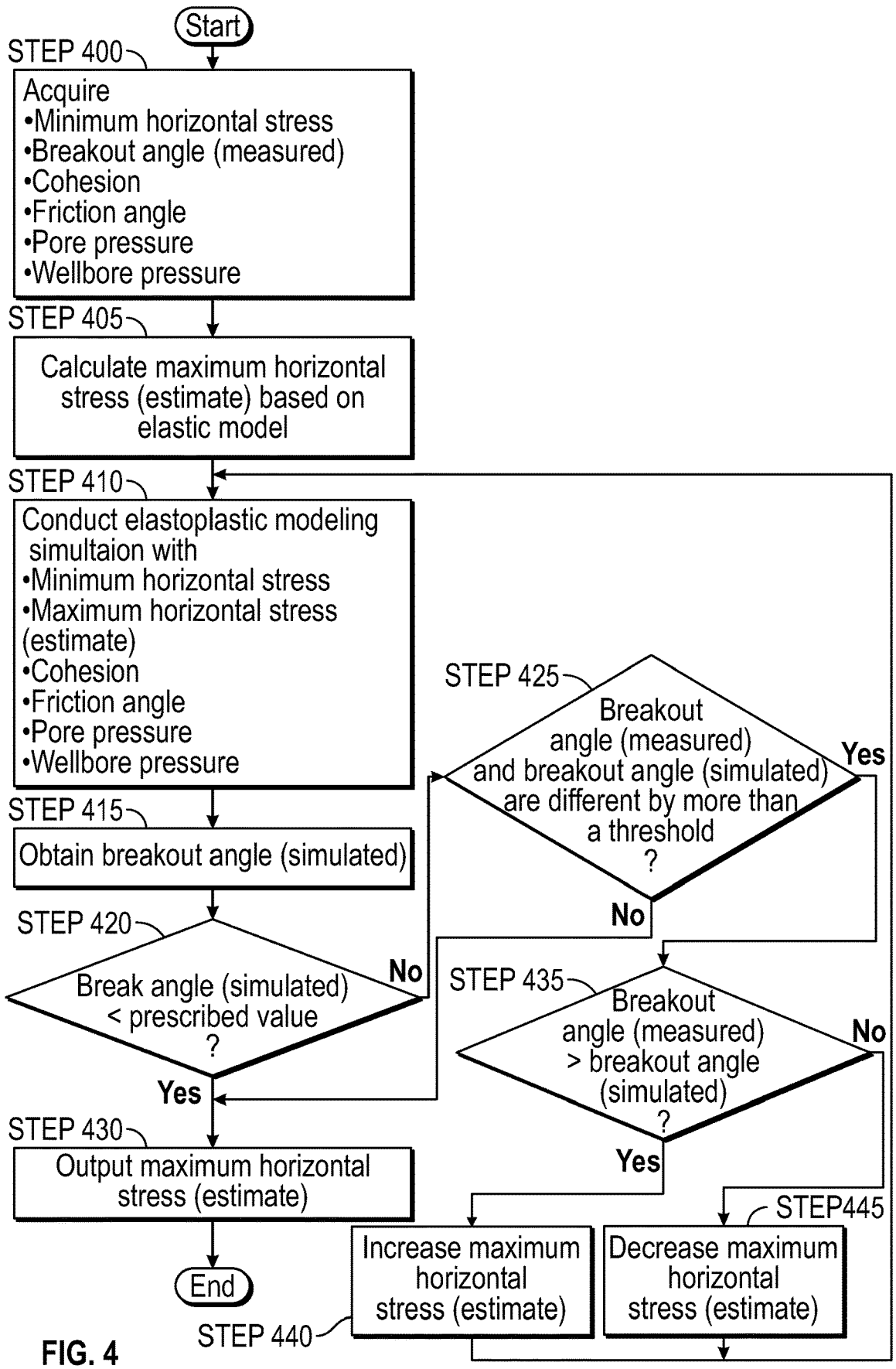
FIG. 4 shows a flowchart describing a method for determining in-situ maximum horizontal stress in accordance with one or more embodiments.

FIG. 4 shows a flowchart describing a method for determining in-situ maximum horizontal stress with elastoplastic modelling of the formation in accordance with one or more embodiments. At Step 400, parameters required to calculate maximum horizontal stress based on modelling of elastic behavior of the formation are acquired. The required parameters depend on a type of modelling of the elastic behavior. For example, when the analytical solution of the stress distribution around a circular bore shown in Equation (1) or (4) is used as described above, the required parameters are measurements or estimates of: the minimum horizontal stress $S_{hmin}$ (or $\sigma_{hmin}$), the angle $\theta_b$, the cohesion c and friction angle $\varphi$ of the formation material, the pore pressure $P_p$, and the wellbore pressure $P_w$. The parameters may be obtained by methods that are described above or methods known to persons skilled in the art. For example, the minimum horizontal stress $S_{hmin}$ (or $\sigma_{hmin}$) may be obtained by conducting a minifrac test. The angle $\theta_b$ may be obtained from the caliper logging data, which is obtained during or after drilling of the wellbore. The cohesion c and friction angle $\varphi$ of the formation material may be obtained by a triaxial compression test conducted on a sample of the formation material.

Then, at Step 405, calculation based on elastic modelling of the behavior of the formation is conducted and an estimate of the maximum horizontal stress $S_{Hmax}$ (or the effective maximum horizontal stress $\sigma_{Hmax}$) is obtained. The estimate may be calculated using Equation (1) or (4) described above, but not limited thereto.

At Step 410, an elastoplastic modelling simulation of the formation around the wellbore is conducted based on the estimate of the maximum horizontal stress $S_{Hmax}$ (or $\sigma_{Hmax}$) to obtain stress distributions around the wellbore. The elastoplastic modelling simulation may be conducted, for example, using a computer with software such as FLAC, continuum modeling software of non-linear material behavior in 2D provided by Itasca Consulting Group, Inc. Additional parameters such as Young's modulus, Poisson's ratio, and density of the formation material may be needed and provided as triaxial compression data (144). Also, a constitutive relation that describes the elastoplastic behavior of the formation is required. Examples of the constitutive relation are described in details later.

Figure 5:
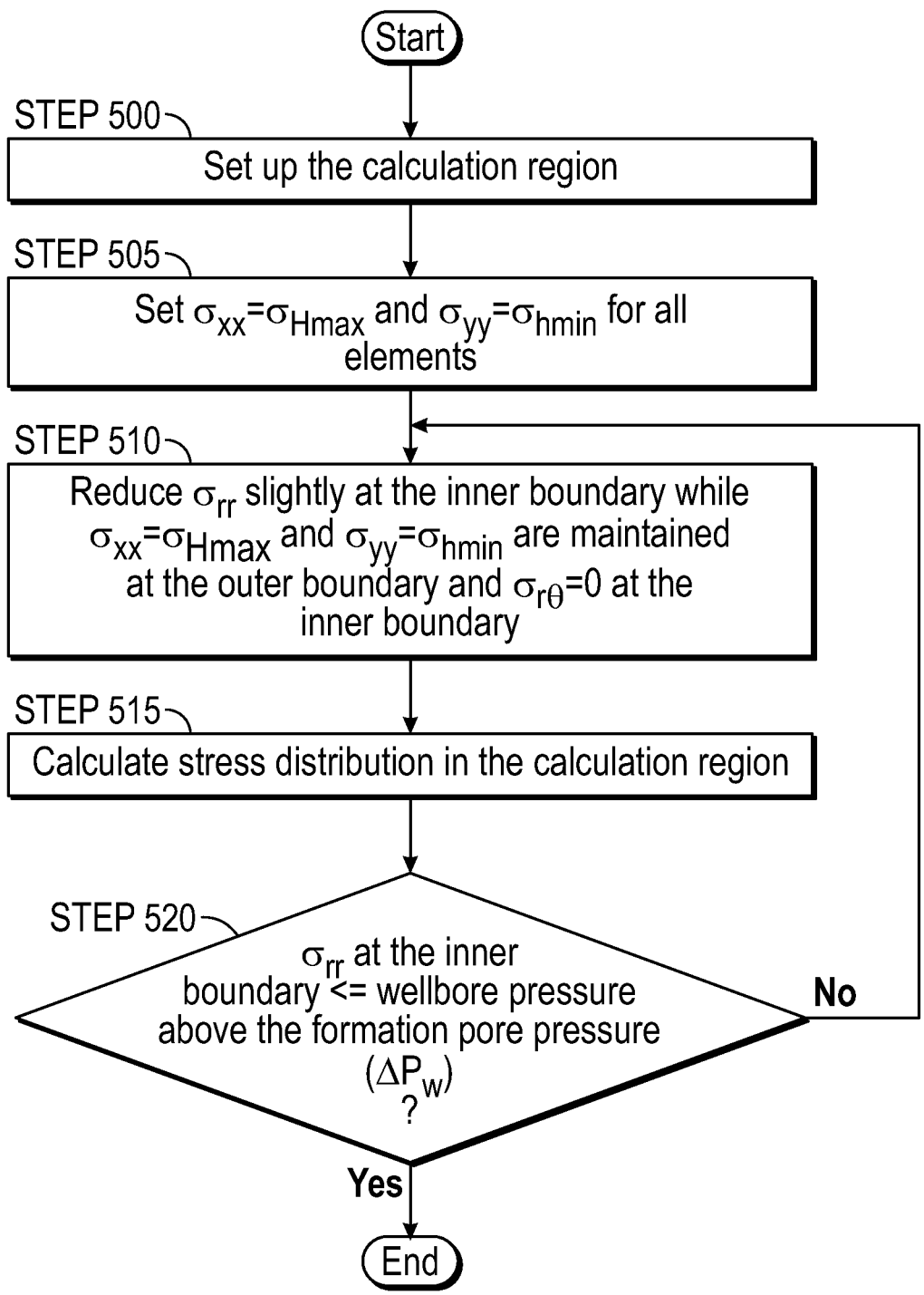
FIG. 5 shows a flowchart describing steps for conducting elastoplastic modelling simulation in accordance with one or more embodiments.

FIG. 5 shows a flowchart describing steps for conducting elastoplastic modelling simulation in accordance with one or more embodiments.

At Step 500, a calculation region for the elastoplastic simulation is set.

Figure 6B:
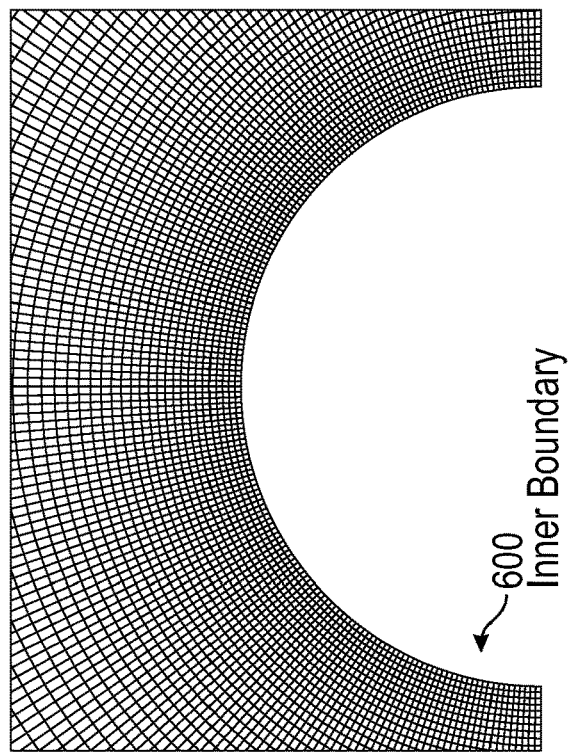
FIGS. 6A and 6B show exemplary diagrams of arrangement of elements where elastoplastic modelling simulation is conducted in accordance with one or more embodiments.
Figure 6A:
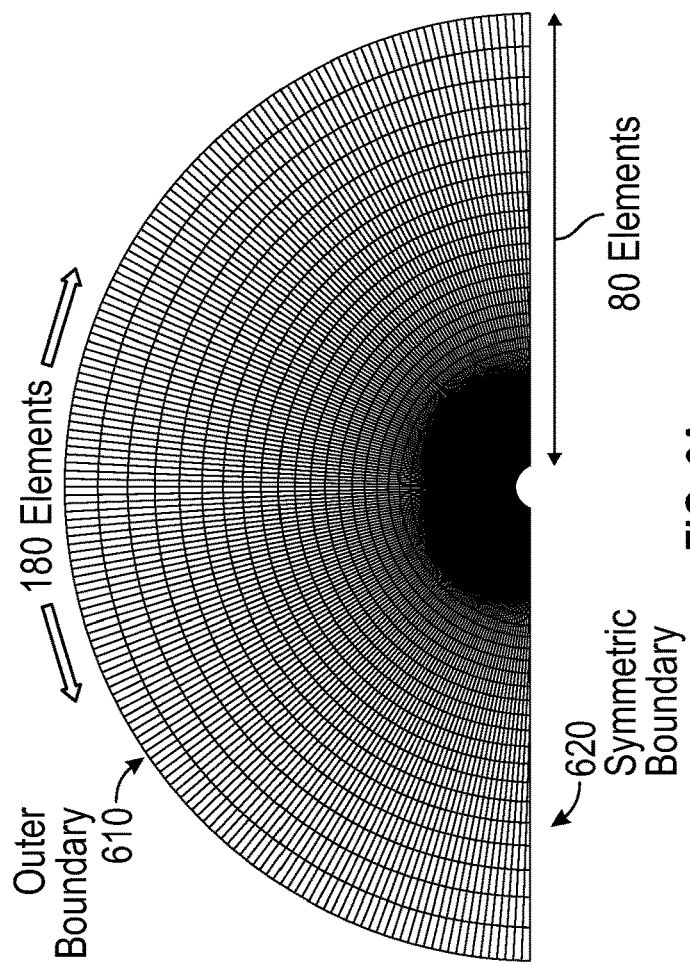

FIGS. 6A and 6B show exemplary diagrams of elements where elastoplastic modelling simulation is conducted in accordance with one or more embodiments. FIG. 6A shows a half of the region of the formation around the wellbore. FIG. 6B is an enlarged view of the simulation region. The region extends radially from an inner boundary (e.g., inner boundary (600)) to an outer boundary (e.g., outer boundary (610)). The inner boundary of the region corresponds to the original sides of the drilled wellbore. The outer boundary is chosen far enough from the inner boundary to simulate a region that is not affected by the wellbore. The radii (e.g., radii (620)) are the boundaries where symmetric conditions are applied in calculation. As seen, by way of example, in FIGS. 6A and 6B, the elements may be substantially rectangular in their shape and may be arranged uniformly in the circumferential direction while their radial dimensions may be smaller toward the inner boundary than those toward the outer boundary. In FIGS. 6A and 6B, the calculation region is divided, by way of example, into 80 elements in the radial direction and 180 elements in the circumferential direction.

Returning to FIG. 5, at Step 505, initial conditions are set such that effective stress $\sigma_x$ and $\sigma_y$ are equal to $\sigma_{Hmax}$ and $\sigma_{hmin}$, respectively, for all elements in the calculation region. Then, at Step 510, absolute values of the effective radial stress $\sigma_{rr}$ and effective shear stress $\sigma_{r\theta}$ are reduced slightly at the inner boundary while $\sigma_x$ and $\sigma_y$ are maintained at $\sigma_{Hmax}$ and $\sigma_{hmin}$, respectively, at the outer boundary. At Step 515, with the new boundary conditions set in the previous step, a stress distribution is calculated based on the elastoplastic behavior of the formation for the rest of the simulation region. Steps 510 and 515 are repeated until the effective radial stress $\sigma_{rr}$ and effective shear stress $\sigma_{r\theta}$ at the inner boundary are determined to be reduced to the wellbore pressure above the formation pore pressure ($\Delta P_w$) at Step 520. This simulates a drilling process of the wellbore and the wellbore pressure above the formation pore pressure ($\Delta P_w$) is zero in one or more embodiments. The effective radial stress $\sigma_{rr}$ and effective shear stress $\sigma_{r\theta}$ may be reduced, for example, by 1/10,000 of their initial values such that Steps 510 and 515 are repeated 10,000 times.

Returning to FIG. 4, at Step 415, the results of simulation of elastoplastic behavior are analyzed and a new estimate of the angle where the breakout starts is obtained as $\theta_{b,1}$. For example, when the stress distribution in the simulation region shown in FIG. 6A is calculated, each of the elements is evaluated with respect to Mohr-Coulomb failure criterion $$\sigma_{\theta\theta} = \frac{1+\sin\varphi}{1-\sin\varphi}\sigma_{rr} + ucs$$

where $$ucs = \frac{2c\cos\varphi}{1-\sin\varphi}$$

and it is determined whether the element undergoes compressive shear yielding. Because the elements that undergo compressive shear yielding consist of the breakout regions, identifying those elements yields the angle $\theta_b$ where the breakout starts in the simulation results.

At Step 420, the new estimate of the angle $\theta_{b,1}$ is compared with a prescribed value, which is described in detail later. When the new estimate of the angle $\theta_{b,1}$ is smaller than the prescribed value, no more simulation is performed and the estimate of the maximum horizontal stress $S_{Hmax}$ (or the effective maximum horizontal stress $\sigma_{Hmax}$) is output at Step 430. The determination of the in-situ maximum horizontal stress is complete. When the new estimate of the angle $\theta_{b,1}$ is equal to or greater than the prescribed value, the process proceeds to Step 425.

It should be noted that Step 420 is optional as describer later in detail. When Step 420 is skipped, the process goes from Step 415 to Step 425 as described next.

The new estimate of the angle $\theta_{b,1}$ is compared with the actual measurement of the angle $\theta_{b,m}$. When the new estimate of the angle $\theta_{b,1}$ is within a predetermined threshold of the measured angle $\theta_{b,m}$, no more simulation is performed and the estimate of the maximum horizontal stress $S_{Hmax}$ (or the effective maximum horizontal stress $\sigma_{Hmax}$) is output at Step 430. Then, the determination of the in-situ maximum horizontal stress is complete.

When the new estimate of the angle $\theta_{b,1}$ is different from the measured angle $\theta_{b,m}$ by more than the predetermined threshold at Step 425, the estimate of the maximum horizontal stress $S_{Hmax}$ (or the effective maximum horizontal stress $\sigma_{Hmax}$) is changed and the simulation of the elastoplastic behavior of the formation is repeated. More specifically, when the new estimate of the angle $\theta_{b,1}$ is greater than the measured angle $\theta_{b,m}$ at Step 435, the estimate of the maximum horizontal stress $S_{Hmax}$ (or the effective maximum horizontal stress $\sigma_{Hmax}$) is increased by a predetermined amount at Step 440. When the new estimate of the angle $\theta_{b,1}$ is smaller than the measured angle $\theta_{b,m}$ at Step 435, the estimate of the maximum horizontal stress $S_{Hmax}$ (or the effective maximum horizontal stress $\sigma_{Hmax}$) is decreased by another predetermined amount at Step 445. The process returns to Step 410 to repeat the simulation of the elastoplastic behavior of the formation with the new estimate of the maximum horizontal stress $S_{Hmax}$ (or the effective maximum horizontal stress $\sigma_{Hmax}$).

The estimate of the maximum horizontal stress $S_{Hmax}$ with which the calculated angle $\theta_b$ matches the measured angle $\theta_{b,m}$ (i.e., the calculated breakout angle $\phi_b$ matches the measured angle $\theta_{b,m}$) can be used for safe and efficient operation of drilling, completion, stimulation, and production around a drilling system. For example, when an item such as the drill bit is inserted into or pulled out of a wellbore, swab and surge pressures are generated and exerted on the wall of the wellbore and the estimate of the maximum horizontal stress $S_{Hmax}$ can be used to determine trip-in and trip-out speeds of the item. The estimate of the maximum horizontal stress $S_{Hmax}$ may also be used to calculate a safe mud weight window in a drilling plan program.

Figure 7A:
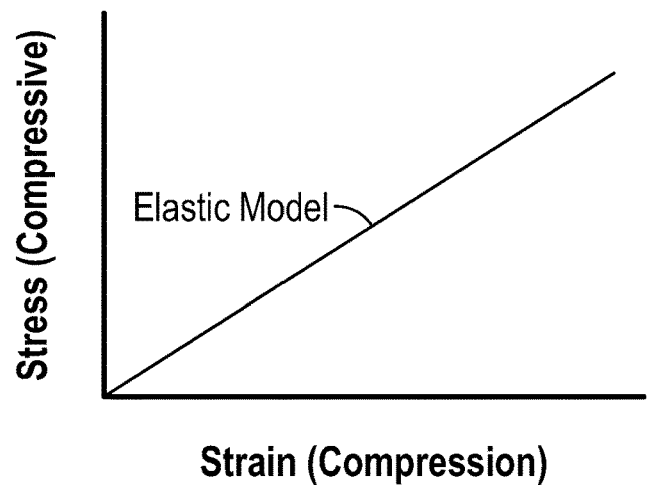
FIGS. 7A-7C show exemplary stress-strain curves that can be used in modelling in accordance with one or more embodiments.
Figure 7B:
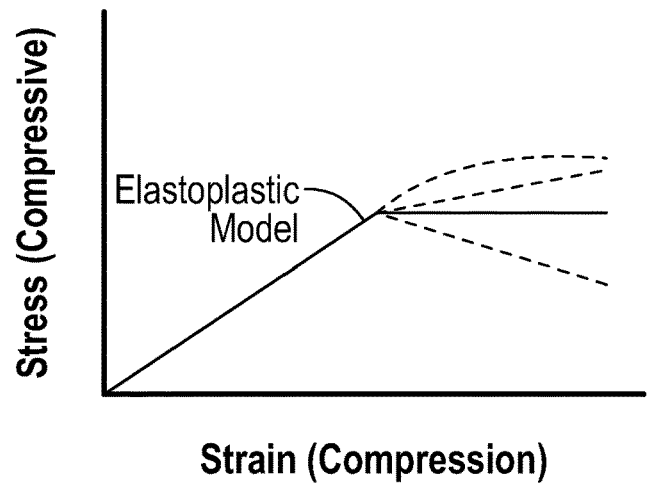
Figure 7C:
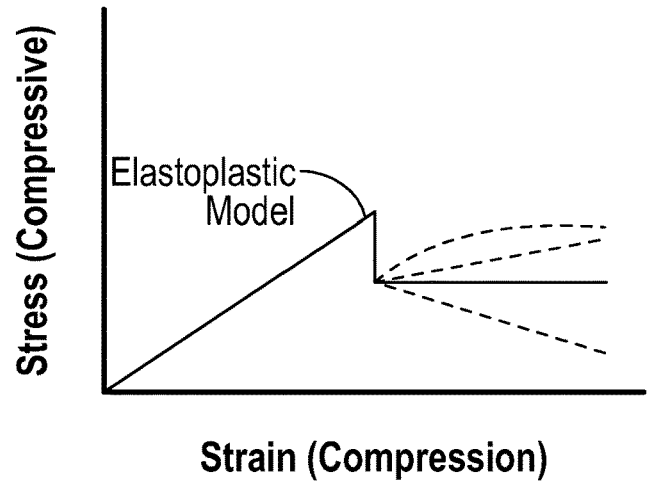

FIGS. 7A-7C show exemplary constitutive relations that can be used in modelling as stress-strain curves in accordance with one or more embodiments. FIG. 7A shows a linear relation of the stress (compressive) and the strain (compression), which designates an elastic behavior of the formation. On the other hand, FIG. 7B shows a linear relation of the stress and the strain up to a certain strain. With the relation shown with a solid line, the compressive stress is maximized at a threshold strain and the stress remains the same at a greater strain than the threshold. The stress for the strain above the threshold may increase or decrease when the strain increases, as indicated, by way of example, by broken lines shown in FIG. 7B. Also, it is possible the stress for the strain above the threshold may exhibit non-linear relation with respect to the strain, as indicated, by way of example, by a broken curve shown in FIG. 7B.

FIG. 7C also shows a linear relation of the stress and the strain up to a certain strain. FIG. 7C shows, however, exemplary constitutive relations in which the stress changes discontinuously at the threshold strain. As shown in FIG. 7C, the formation may sustain a non-zero stress at the strain above the threshold. It is possible, however, the stress sustained by the formation at the strain above the threshold is substantially zero.

It should be noted that, in FIGS. 7B and 7C, the threshold strain below which the formation shows a linear relation between the stress and the strain may or may not correspond to the formation's unconfined compressive strength.

Figure 8A:
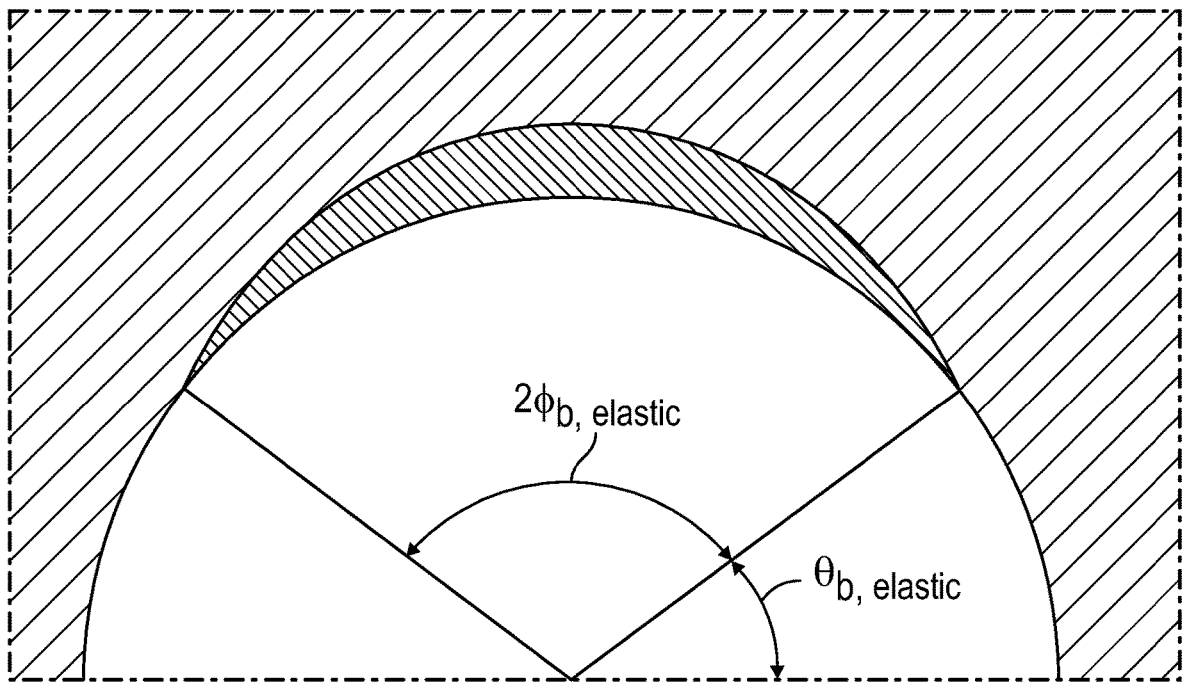
FIGS. 8A and 8B show diagrams describing exemplary shapes of breakout regions obtained by simulating elastic and elastoplastic behaviors in accordance with one or more embodiments.
Figure 8B:
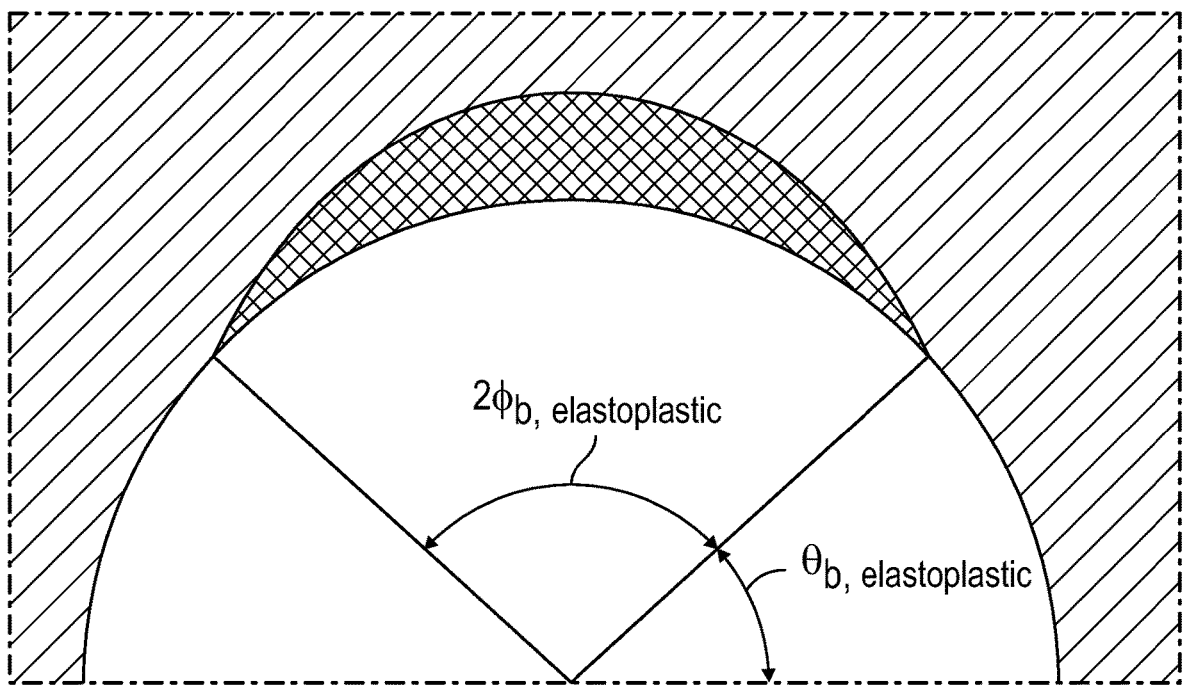

By choosing an appropriate one of the constitutive relations shown in FIGS. 7B and 7C, elastoplastic behavior of the formation can be simulated. To the contrary, by choosing the linear constitutive relation shown in FIG. 7A, elastic behavior of the formation is simulated. FIGS. 8A and 8B show diagrams describing exemplary shapes of the breakout regions obtained by simulating elastic and elastoplastic behaviors, respectively, in accordance with one or more embodiments. The parameters commonly used to obtain the diagrams shown in FIGS. 8A and 8B follow:

Effective maximum horizontal stress $\sigma_{Hmax}$=40 MPa,
Effective minimum horizontal stress $\sigma_{hmin}$=20 MPa,
Cohesion c=15 MPa,
Friction angle $\varphi$=30 degrees, and
Wellbore pressure above the formation pressure $\Delta P_w$=0.

A constitutive relation for the elastoplastic behavior is chosen as shown in the solid line in FIG. 7B and the threshold stress at which the slope of the line changes is assumed to correspond to the unconfined compressive strength $$ucs = \frac{2c\cos\varphi}{1 - \sin\varphi}.$$

As one can see, the angle $\theta_{b,elastic}$ shown in FIG. 8A is smaller than the angle $\theta_{b,elastoplastic}$ shown in FIG. 8B. Namely, the calculated breakout angle is larger in the elastic simulation than in the elastoplastic simulation. In order to achieve the substantially similar calculated breakout angles in the elastic simulation and in the elastoplastic simulation, the smaller effective maximum horizontal stress $\sigma_{Hmax}$ must be set for the elastic simulation than for the elastoplastic simulation. Therefore, the effective maximum horizontal stress $\sigma_{Hmax}$ (and the maximum horizontal stress $S_{Hmax}$) tends to be underestimated in the elastic simulation than in the elastoplastic simulation.

More comparisons between the elastic simulation and the elastoplastic simulation are shown in Table 1.

Table 1 shows breakout angles $\phi_{b,elastoplastic}$ calculated for various sets of effective maximum horizontal stress $\sigma_{Hmax}$, cohesion c, and friction angle $\varphi$ using elastoplastic simulation of the formation. The effective minimum horizontal stress $\sigma_{hmin}$=20 MPa and the wellbore pressure above the formation pressure $\Delta P_w$=0 are commonly used. The cohesion c and friction angle $\varphi$ are chosen to yield the same unconfined compressive strength $$ucs = \frac{2c\cos\varphi}{1 - \sin\varphi}$$

of 52 MPa. Also shown in Table 1 are the effective maximum horizontal stress $\sigma_{Hmax,elastic}$ using Equation (4) (i.e., assumed elastic behavior of the formation) with $\theta_b$ corresponding to $\phi_{b,elastoplastic}$ and absolute values of estimation errors obtained as $$\frac{|\sigma_{Hmax} - \sigma_{Hmax,elastic}|}{\sigma_{Hmax}}.$$

TABLE 1

| $\sigma_{Hmax}$ (MPa) | c (MPa) | $\varphi$ (deg.) | $\phi_{b,elastioplastic}$ (deg.) | $\sigma_{Hmax,elastic}$ (MPa) | Estimation Error |
|---|---|---|---|---|---|
| 25 | 19.93 | 15 | 24.5 | 25.1 | 0.7% |
| 25 | 18.19 | 20 | 24.5 | 25.1 | 0.7% |
| 25 | 16.55 | 25 | 24.5 | 25.1 | 0.7% |

TABLE 1-continued

| $\sigma_{Hmax}$ (MPa) | c (MPa) | $\varphi$ (deg.) | $\phi_{b,elastioplastic}$ (deg.) | $\sigma_{Hmax,elastic}$ (MPa) | Estimation Error |
|---|---|---|---|---|---|
| 25 | 15 | 30 | 24.5 | 25.1 | 0.7% |
| 25 | 13.52 | 35 | 24.5 | 25.1 | 0.6% |
| 25 | 12.11 | 40 | 25.5 | 25.3 | 1.1% |
| 30 | 19.93 | 15 | 39.5 | 28.66 | 4.5% |
| 30 | 18.19 | 20 | 39.5 | 28.66 | 4.5% |
| 30 | 16.55 | 25 | 40.5 | 29.11 | 3.0% |
| 30 | 15 | 30 | 41.5 | 29.62 | 1.3% |
| 30 | 13.52 | 35 | 40.5 | 29.11 | 3.0% |
| 30 | 12.11 | 40 | 41.5 | 29.62 | 1.3% |
| 35 | 19.93 | 15 | 43.5 | 30.82 | 11.9% |
| 35 | 18.19 | 20 | 45.5 | 32.39 | 7.5% |
| 35 | 16.55 | 25 | 44.5 | 31.56 | 9.8% |
| 35 | 15 | 30 | 45.5 | 32.39 | 7.5% |
| 35 | 13.52 | 35 | 44.5 | 31.56 | 9.8% |
| 35 | 12.11 | 40 | 45.5 | 32.39 | 7.5% |
| 40 | 19.93 | 15 | 44.5 | 31.56 | 21.1% |
| 40 | 18.19 | 20 | 45.5 | 32.39 | 19.0% |
| 40 | 16.55 | 25 | 46.5 | 33.36 | 16.6% |
| 40 | 15 | 30 | 46.5 | 33.36 | 16.6% |
| 40 | 13.52 | 35 | 46.5 | 33.36 | 16.6% |
| 40 | 12.11 | 40 | 47.5 | 34.49 | 13.8% |
| 45 | 19.93 | 15 | 44.5 | 31.56 | 29.9% |
| 45 | 18.19 | 20 | 45.5 | 32.39 | 28.2% |
| 45 | 16.55 | 25 | 46.5 | 33.36 | 25.9% |
| 45 | 15 | 30 | 47.5 | 34.49 | 23.4% |
| 45 | 13.52 | 35 | 48.5 | 35.82 | 20.4% |
| 45 | 12.11 | 40 | 48.5 | 35.82 | 20.4% |
| 50 | 19.93 | 15 | 44.5 | 31.56 | 36.9% |
| 50 | 18.19 | 20 | 45.5 | 32.39 | 35.2% |
| 50 | 16.55 | 25 | 47.5 | 34.49 | 31.0% |
| 50 | 15 | 30 | 47.5 | 34.49 | 31.0% |
| 50 | 13.52 | 35 | 48.5 | 35.82 | 28.4% |
| 50 | 12.11 | 40 | 49.5 | 37.41 | 25.2% |

As seen in Table 1, the estimation error between the elastic modelling and the elastoplastic modelling is not significant when the effective maximum horizontal stress is relatively close to the effective minimum horizontal stress (i.e., when the ratio of the effective maximum horizontal stress to the effective minimum horizontal stress is not too greater than 1.0). Also, it could be noted that, when the effective maximum horizontal stress is relatively close to the effective minimum horizontal stress, the breakout angle simulated for the elastoplastic behavior of the geological formation $\phi_{b,elastoplastic}$ is smaller than a certain value such as 40 degrees. Therefore, when the breakout angle $\phi_{b,elastoplastic}$ is smaller than a certain value (i.e., the angle $\theta_b$ obtained by simulation of the elastoplastic behavior of the geological formation is greater than a predetermined threshold value), an error between the elastic modelling and the elastoplastic modeling may be small and the simulation results obtained with the elastoplastic modeling can be used without further adjustment of the estimate of the maximum horizontal stress. Namely, in the flowchart describing the exemplary method for determining the maximum horizontal stress shown in FIG. 4, when the new estimate of the angle $\theta_{b,1}$ is smaller than a prescribed value at Step 420, the new estimate of the angle $\theta_{b,1}$ may be determined as a good estimate and the process may proceed to Step 430 to output the new estimate of the angle $\theta_{b,1}$. The prescribed value (e.g., 40 degrees in the case seen in Table 1) may be determined by conducting, in advance, the elastoplastic modelling with various parameters as exemplified in Table 1.

Figure 9:
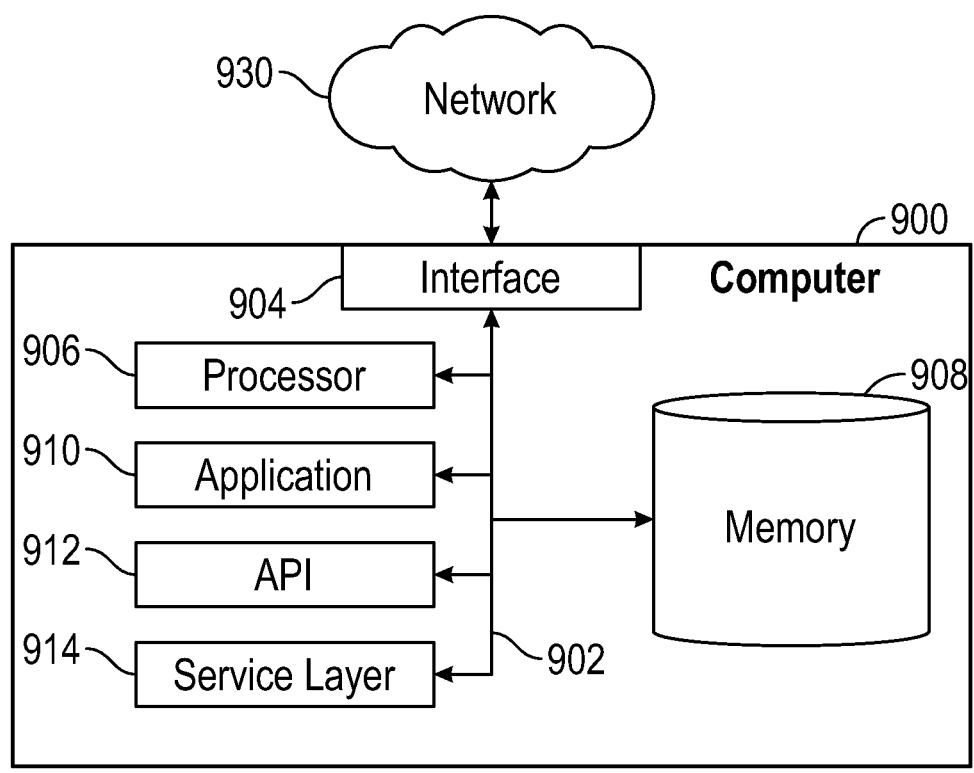
FIG. 9 shows a computer system in accordance with one or more embodiments.

Above-described embodiments may be implemented on a computer system. FIG. 9 is a block diagram of a computer system (900) used to provide computational functionalities associated with described algorithms, methods, functions, processes, flows, and procedures as described in the instant disclosure, according to an implementation. The illustrated computer (900) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (900) may include a computer that includes an input device, such as a keypad, keyboard, touch screen, or other device that can accept user information, and an output device that conveys information associated with the operation of the computer (900), including digital data, visual, or audio information (or a combination of information), or a GUI.

The computer (900) can serve in a role as a client, network component, a server, a database or other persistency, or any other component (or a combination of roles) of a computer system for performing the subject matter described in the instant disclosure. The illustrated computer (900) is communicably coupled with a network (930). In some implementations, one or more components of the computer (900) may be configured to operate within environments, including cloud-computing-based, local, global, or other environment (or a combination of environments).

At a high level, the computer (900) is an electronic computing device operable to receive, transmit, process, store, or manage data and information associated with the described subject matter. According to some implementations, the computer (900) may also include or be communicably coupled with an application server, e-mail server, web server, caching server, streaming data server, business intelligence (BI) server, or other server (or a combination of servers).

The computer (900) can receive requests over network (930) from a client application (for example, executing on another computer (900)) and responding to the received requests by processing the said requests in an appropriate software application. In addition, requests may also be sent to the computer (900) from internal users (for example, from a command console or by other appropriate access method), external or third-parties, other automated applications, as well as any other appropriate entities, individuals, systems, or computers.

Each of the components of the computer (900) can communicate using a system bus (902). In some implementations, any or all of the components of the computer (900), both hardware or software (or a combination of hardware and software), may interface with each other or the interface (904) (or a combination of both) over the system bus (902) using an application programming interface (API) (912) or a service layer (914) (or a combination of the API (912) and service layer (914)). The API (912) may include specifications for routines, data structures, and object classes. The API (912) may be either computer-language independent or dependent and refer to a complete interface, a single function, or even a set of APIs. The service layer (914) provides software services to the computer (900) or other components (whether or not illustrated) that are communicably coupled to the computer (900). The functionality of the computer (900) may be accessible for all service consumers using this service layer. Software services, such as those provided by the service layer (914), provide reusable, defined business functionalities through a defined interface. For example, the interface may be software written in JAVA, C++, or other suitable language providing data in extensible markup language (XML) format or other suitable format. While illustrated as an integrated component of the computer (900), alternative implementations may illustrate the API (912) or the service layer (914) as stand-alone components in relation to other components of the computer (900) or other components (whether or not illustrated) that are communicably coupled to the computer (900). Moreover, any or all parts of the API (912) or the service layer (914) may be implemented as child or sub-modules of another software module, enterprise application, or hardware module without departing from the scope of this disclosure.

The computer (900) includes an interface (904). Although illustrated as a single interface (904) in FIG. 9, two or more interfaces (904) may be used according to particular needs, desires, or particular implementations of the computer (900). The interface (904) is used by the computer (900) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (900).

The computer (900) includes at least one computer processor (906). Although illustrated as a single computer processor (906) in FIG. 9, two or more processors may be used according to particular needs, desires, or particular implementations of the computer (900). Generally, the computer processor (906) executes instructions and manipulates data to perform the operations of the computer (900) and any algorithms, methods, functions, processes, flows, and procedures as described in the instant disclosure.

The computer (900) also includes a memory (908) that holds data for the computer (900) or other components (or a combination of both) that can be connected to the network (930). For example, memory (908) can be a database storing data consistent with this disclosure. Although illustrated as a single memory (908) in FIG. 9, two or more memories may be used according to particular needs, desires, or particular implementations of the computer (900) and the described functionality. While memory (908) is illustrated as an integral component of the computer (900), in alternative implementations, memory (908) can be external to the computer (900).

The application (910) is an algorithmic software engine providing functionality according to particular needs, desires, or particular implementations of the computer (900), particularly with respect to functionality described in this disclosure. For example, application (910) can serve as one or more components, modules, applications, etc. Further, although illustrated as a single application (910), the application (910) may be implemented as multiple applications (910) on the computer (900). In addition, although illustrated as integral to the computer (900), in alternative implementations, the application (910) can be external to the computer (900).

There may be any number of computers (900) associated with, or external to, a computer system containing computer (900), each computer (900) communicating over network (930). Further, the term "client," "user," and other appropriate terminology may be used interchangeably as appropriate without departing from the scope of this disclosure.

Moreover, this disclosure contemplates that many users may use one computer (900), or that one user may use multiple computers (900).

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method for obtaining a maximum horizontal stress at a depth of a geological formation, comprising:
    setting an estimate $S_{Hmax}$ of the maximum horizontal stress;
    conducting an elastoplastic modeling simulation of the geological formation around a wellbore with the estimate $S_{Hmax}$ and obtaining a simulated value $\phi_{b,1}$ of a breakout angle, wherein the breakout angle is a half-width of a breakout region,
    wherein conducting the elastoplastic modeling simulation comprises:
        setting up a calculation region, wherein the calculation region has a boundary that corresponds to a wall of the wellbore;
        setting a uniform stress condition for an entirety of the calculation region, wherein the uniform stress condition is represented by the estimate $S_{Hmax}$, a minimum horizontal stress, and a pore pressure of the geological formation at the depth; and
        repeatedly reducing a normal stress that acts perpendicular to the boundary at the boundary by an amount while the uniform stress condition far away from the boundary is maintained and a shear stress at the boundary is maintained to be zero and calculating stress conditions in the calculation region until the normal stress at the boundary is substantially equal to a wellbore pressure above the pore pressure, and
    wherein the estimate $S_{Hmax}$ comprises calculating the estimate $S_{Hmax}$ as $$S_{Hmax} = \frac{ucs + \Delta P_W + 2P_p}{1 - 2\cos 2\theta_b} - S_{hmin}\frac{1 + 2\cos 2\theta_b}{1 - 2\cos 2\theta_b},$$

where
    $\theta_b$ is equal to $90° - \phi_{b,m}$ and obtained from a caliper log,
    $P_p$ is the pore pressure of the geological formation at the depth,
    $\Delta P_W$ is a wellbore pressure $P_W$ at the depth above $P_p$,
    $S_{hmin}$ is the minimum horizontal stress at the depth,
    ucs is an unconfined compressive strength calculated as $$ucs = \frac{2c\cos\varphi}{1 - \sin\varphi},$$

c is a cohesion of the geological formation at the depth, and
        φ is a friction angle of the geological formation at the depth; and
    upon determining that the simulated value $\phi_{b,1}$ is greater than or equal to a prescribed value and is different from a measured breakout angle $\phi_{b,m}$ at the depth by more than a threshold value, repeatedly changing the estimate $S_{Hmax}$ and conducting the elastoplastic modeling simulation.

2. The method according to claim 1, wherein the setting the estimate $S_{Hmax}$ comprises calculating the estimate $S_{Hmax}$ based on an elastic modeling simulation of the geological formation around the wellbore.

3. The method according to claim 1, wherein the changing the estimate $S_{Hmax}$ comprises:
    in response to $\phi_{b,m} > \phi_{b,1}$, increasing the estimate $S_{Hmax}$ by a first prescribed amount; and
    in response to $\phi_{b,m} < \phi_{b,1}$, decreasing the estimate $S_{Hmax}$ by a second prescribed amount.

4. The method according to claim 1, further comprising:
    determining a safe mud weight window in a drilling of the wellbore based on the estimate $S_{Hmax}$.

5. A system, comprising:
    a logging system coupled to a plurality of logging tools; and
    a formation breakout simulator comprising a computer processor, wherein the formation breakout simulator is coupled to the logging system, the formation breakout simulator comprising functionality for:
        setting an estimate $S_{Hmax}$ of a maximum horizontal stress;
        conducting an elastoplastic modeling simulation of a geological formation around a wellbore with the estimate $S_{Hmax}$ and obtaining a simulated value $\phi_{b,1}$ of a breakout angle, wherein the breakout angle is a half-width of a breakout region,
        wherein conducting the elastoplastic modeling simulation comprises:
            setting up a calculation region, wherein the calculation region has a boundary that corresponds to a wall of the wellbore;
            setting a uniform stress condition for an entirety of the calculation region, wherein the uniform stress condition is represented by the estimate $S_{Hmax}$, a minimum horizontal stress, and a pore pressure of the geological formation at the depth; and repeatedly reducing a normal stress that acts perpendicular to the boundary at the boundary by an amount while the uniform stress condition far away from the boundary is maintained and a shear stress at the boundary is maintained to be zero and calculating stress conditions in the calculation region until the normal stress at the boundary is substantially equal to a wellbore pressure above the pore pressure, and wherein the estimate $S_{Hmax}$ comprises calculating the estimate $S_{Hmax}$ as $$S_{Hmax} = \frac{ucs + \Delta P_W + 2P_p}{1 - 2\cos2\theta_b} - S_{hmin}\frac{1 + 2\cos2\theta_b}{1 - 2\cos2\theta_b},$$

where $\theta_b$ is equal to $90° - \phi_{b,m}$ and obtained from a caliper log, $P_p$ is the pore pressure of the geological formation at the depth, $\Delta P_w$ is a wellbore pressure $P_w$ at the depth above $P_p$, $S_{hmin}$ is the minimum horizontal stress at the depth, ucs is an unconfined compressive strength calculated as $$ucs = \frac{2c\cos\varphi}{1 - \sin\varphi},$$

c is a cohesion of the geological formation at the depth, and $\varphi$ is a friction angle of the geological formation at the depth; and upon determining that the simulated value $\phi_{b,1}$ is greater than or equal to a prescribed value and is different from a measured breakout angle $\phi_{b,m}$ at the depth by more than a threshold value, repeatedly changing the estimate $S_{Hmax}$ and conducting the elastoplastic modeling simulation.

6. The system according to claim 5, wherein the setting the estimate $S_{Hmax}$ comprises calculating the estimate $S_{Hmax}$ based on an elastic modeling simulation of the geological formation around the wellbore.

7. The system according to claim 5, wherein the changing the estimate $S_{Hmax}$ comprises:

in response to $\phi_{b,m} > \phi_{b,1}$, increasing the estimate $S_{Hmax}$ by a first prescribed amount; and in response to $\phi_{b,m} < \phi_{b,1}$, decreasing the estimate $S_{Hmax}$ by a second prescribed amount.

8. The system according to claim 5, wherein the formation breakout simulator further comprises functionality for:

determining a safe mud weight window in a drilling of the wellbore based on the estimate $S_{Hmax}$.

9. A non-transitory computer readable medium storing instructions executable by a computer processor, the instructions comprising functionality for:

setting an estimate $S_{Hmax}$ of a maximum horizontal stress;

conducting an elastoplastic modeling simulation of a geological formation around a wellbore with the estimate $S_{Hmax}$ and obtaining a simulated value $\phi_{b,1}$ of a breakout angle, wherein the breakout angle is a half-width of a breakout region, wherein conducting the elastoplastic modeling simulation comprises:

setting up a calculation region, wherein the calculation region has a boundary that corresponds to a wall of the wellbore;

setting a uniform stress condition for an entirety of the calculation region, wherein the uniform stress condition is represented by the estimate $S_{Hmax}$, a minimum horizontal stress, and a pore pressure of the geological formation at the depth; and repeatedly reducing a normal stress that acts perpendicular to the boundary at the boundary by an amount while the uniform stress condition far away from the boundary is maintained and a shear stress at the boundary is maintained to be zero and calculating stress conditions in the calculation region until the normal stress at the boundary is substantially equal to a wellbore pressure above the pore pressure, and wherein the estimate $S_{Hmax}$ comprises calculating the estimate $S_{Hmax}$ as $$S_{Hmax} = \frac{ucs + \Delta P_W + 2P_p}{1 - 2\cos2\theta_b} - S_{hmin}\frac{1 + 2\cos2\theta_b}{1 - 2\cos2\theta_b},$$

where $\theta_b$ is equal to $90° - \phi_{b,m}$ and obtained from a caliper log, $P_p$ is the pore pressure of the geological formation at the depth, $\Delta P_w$ is a wellbore pressure $P_w$ at the depth above $P_p$, $S_{hmin}$ is the minimum horizontal stress at the depth, ucs is an unconfined compressive strength calculated as $$ucs = \frac{2c\cos\varphi}{1 - \sin\varphi},$$

c is a cohesion of the geological formation at the depth, and $\varphi$ is a friction angle of the geological formation at the depth; and upon determining that the simulated value $\phi_{b,1}$ is greater than or equal to a prescribed value and is different from a measured breakout angle $\phi_{b,m}$ at the depth by more than a threshold value, repeatedly changing the estimate $S_{Hmax}$ and conducting the elastoplastic modeling simulation.

10. The non-transitory computer readable medium according to claim 9, wherein the setting the estimate $S_{Hmax}$ comprises calculating the estimate $S_{Hmax}$ based on an elastic modeling simulation of the geological formation around the wellbore.

11. The non-transitory computer readable medium according to claim 9, wherein the changing the estimate $S_{Hmax}$ comprises:

in response to $\phi_{b,m} > \phi_{b,1}$, increasing the estimate $S_{Hmax}$ by a first prescribed amount; and in response to $\phi_{b,m}<\phi_{b,1}$, decreasing the estimate $S_{Hmax}$ by a second prescribed amount.

* * * * *